United States Patent [19]

Brooks

[11] 4,373,204
[45] Feb. 8, 1983

[54] PHASE LOCKED LOOP TIMING RECOVERY CIRCUIT

[75] Inventor: Grant P. Brooks, Randolph, N.J.

[73] Assignee: Bell Telephone Laboratories, Incorporated, Murray Hill, N.J.

[21] Appl. No.: 230,760

[22] Filed: Feb. 2, 1981

[51] Int. Cl.³ ............................................. H04L 7/08
[52] U.S. Cl. .................................. 375/120; 307/262; 307/269; 328/63; 331/1 A
[58] Field of Search ............................... 375/118–120; 307/262, 269; 328/63, 72; 331/1 A, 17

[56] References Cited

U.S. PATENT DOCUMENTS

| | | | |
|---|---|---|---|
| 3,141,930 | 7/1964 | Krauss | 375/119 |
| 3,404,230 | 10/1968 | Hailey et al. | 331/1 A |
| 3,488,440 | 1/1970 | Logan et al. | 375/119 |
| 3,646,269 | 2/1972 | Fudemoto et al. | |
| 4,216,544 | 8/1980 | Boleda et al. | 375/119 |

Primary Examiner—Marc E. Bookbinder
Attorney, Agent, or Firm—Roy C. Lipton

[57] ABSTRACT

The phase of timing signals is compared with the phase of incoming digital signals to produce phase error signals and repeated phase corrections of the timing signals are made in accordance with the phase error signals. The phase corrections are initially delayed until phase error signals exceeding a predetermined magnitude persist for a predetermined interval of time. The corrections are removed without delay when the phase error signals are discontinued.

4 Claims, 2 Drawing Figures

PHASE LOCKED LOOP TIMING RECOVERY CIRCUIT

TECHNICAL FIELD

This invention relates to timing wave recovery circuits and, more particularly, to recovery circuits for maintaining locally generated timing wave signals in phase with incoming digital signals.

BACKGROUND OF THE INVENTION

The reception of digital signals requires that the receiver correctly samples each of the bits or pulses in the incoming pulse train. Bit sampling is conventionally accomplished by a locally generated timing wave signal which is maintained in phase with the incoming signals. A known implementation for maintaining a generated timing wave signal in phase with a pulse train comprises a phase locked loop. The principal components of the phase locked loop consist of a phase controllable wave generator and a phase comparator for comparing the phase of transitions of the generated wave with the phase of transitions of the incoming signals. Each comparison results in a phase error output signal whose magnitude defines the magnitude of the difference in phase between the timing wave and the input signals and whose polarity defines whether the timing wave signals lead or lag the phase of the input signals. Phase error outputs of the comparator are then used to modify the relative phase of the generated output wave with respect to the phase of the input signals in a direction that will achieve bit synchronization.

The incoming signals are, of course, subject to interferences such as noise. Noise signals can generally be filtered or blocked out before they reach the phase locked loop but it is inevitable that some of the noise will occasionally get through. Noise signals may therefore be applied to the comparator and the occasional noise signal transition may be interpreted by the phase comparator as being derived from the incoming signals. The consequent phase comparison of noise and the timing wave by the comparator improperly modifies the wave generator phase. It is a broad object of the invention to maintain a locally generated timing wave in phase with incoming signals which are subject to interferences. It is a more specific object to distinguish between digital signal transitions and occasional interference signal transitions.

In U.S. Pat. No. 3,488,440, which issued to M. A. Logan and H. C. Schroeder on Jan. 6, 1970, there is disclosed a timing wave recovery circuit that provides a solution to the incoming signal interference problem. In accordance therewith, a plurality of phase comparisons are analyzed over a time interval. A phase modification of the timing wave signal is made at the termination of the interval in accordance with the analysis. In the analysis, any occasional phase comparison inconsistent with other comparisons is ignored, since the occasional inconsistent comparison is likely due to an incoming noise transition. This type of phase correction, however, results in substantial intervals between corrections.

It may be desirable to rapidly correct the timing wave phase, such as when a large phase angle error exists. The H. A. Logan et al patent disclosed an arrangement whereby the analysis interval may be substantially reduced or phase corrections may be made for each phase comparison. This arrangement, as disclosed in the M. A. Logan et al patent, is relatively complex and complicated. Moreover, the arrangement becomes more vulnerable to noise when the analysis period is reduced and further vulnerable to noise when corrections are made for each comparison.

Accordingly, it is a further object of this invention to provide a simple and uncomplicated arrangement which rapidly phase synchronizes a timing wave signal with an incoming signal subject to noise.

SUMMARY OF THE INVENTION

Objects of this invention are achieved by repeatedly modifying the relative phase of the timing wave signal when the phase error signals persist for a predetermined interval of time. More specifically, the repeated modifying is delayed for an interval of time after the phase error signals are initially produced by the comparator and the modifying is terminated, without delay when the phase error signals are terminated. Delaying modification until the error signals persist for a time interval insures that the error signals are not due to the occasional incoming noise. Repeated phase modifications when the phase error signals persist provide for rapid synchronization of the timing wave.

In accordance with a feature of this invention, the modifying requires the persistance of phase error signals which define magnitudes of relative phase difference that exceed a predetermined threshold. This insures that the loop does not hunt back and forth when substantially in phase with the incoming signals.

The foregoing and other objects and features of this invention will be more fully understood from the following description of an illustrative embodiment thereof taken in conjunction with the accompanying drawings.

DETAILED DESCRIPTION

Figure 1:
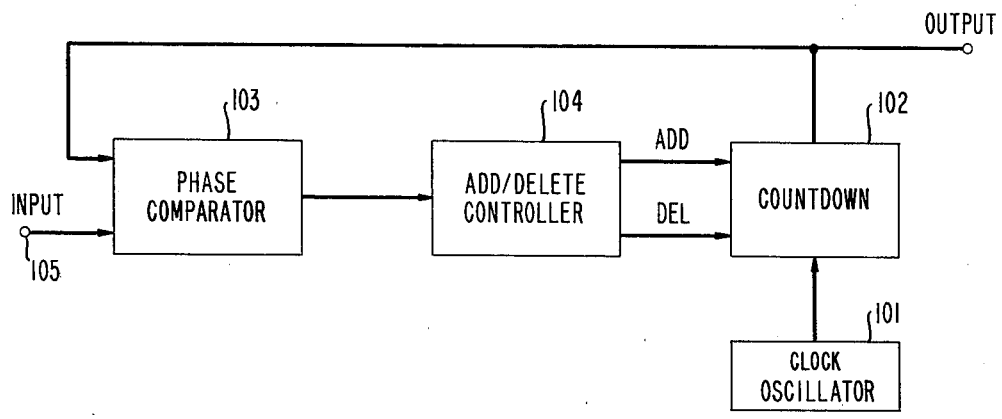
FIG. 1 shows, in block form, a phase locked loop arranged to generate timing wave signals in phase with incoming digital signals in accordance with this invention.

The phase lock loop shown in FIG. 1 generally comprises clock oscillator 101, count-down circuit 102, phase comparator 103 and add/delete controller 104. The phase lock loop operates to lock the output timing signals of count-down circuit 102 in phase with incoming digital data signals being received at terminal 105. It is to be understood that the timing signals may be useful for various purposes, such as signal sampling. In providing the useful purpose, it may be preferable that the timing signals be in phase coincidence with the incoming signal transitions or lead or lag the incoming signals by a predetermined constant phase angle. It is therefore to be understood that when it is stated that the timing wave is "in phase" with the incoming signals, the timing wave may be in phase coincidence or may lead or lag by a predetermined phase angle.

Input clocking signals provided to count-down circuit 102 are derived from high speed clock oscillator 101. The high speed clock pulses of clock oscillator 101 are divided down by count-down circuit 102 to a resultant square wave output which is equal in frequency to the frequency of the incoming data signals.

Phase comparator 103 compares the phase of these square wave timing signals with the transitions of the incoming data signals. In accordance with this specific embodiment if the two signals are substantially in phase, the voltage output of phase comparator 103 is substantially at "0" or ground. If the phase of the transitions of the timing wave signals should lag the phase of the incoming data signals, the output voltage of phase comparator 103 goes positive with respect to ground, the amplitude thereof being directly related to the magnitude of the difference in phase. Alternatively, if the timing wave signals lead the phase of the incoming data transitions the output voltage of phase comparator 103 goes negative with respect to ground. These output voltage signals of phase comparator 103 are passed to add/delete controller 104.

It is the function of add/delete controller 104 to correct the phase of count-down circuit 102 under control of the output voltages from phase comparator 103. When the input signals are substantially in phase with the timing signals, the output voltage of phase comparator 103 is substantially at ground. Add/delete controller 104 provides no output correction signals to either of its two output leads identified as leads ADD and DEL. Count-down circuit 102, in turn, is neither advanced nor retarded in phase and the loop is in a "lock" condition. It is a feature of add/delete controller 104 that no output correction signals are provided so long as the voltage output of phase comparator 103 does not exceed a predetermined threshold amplitude. Accordingly, the loop remains in lock, for reasons described hereinafter, so long as neither the positive voltage nor the negative voltage output of phase comparator 103 exceeds the predetermined threshold. This feature insures that the loop does not hunt back and forth when in a substantially correct phase.

It is a further feature of add/delete controller 104 that the generation of output correction signals is delayed for a time period which is sufficiently long in duration to ignore momentary phase variations that may be caused by noise, for example. Assuming, however, that a voltage output of phase comparator 103 exceeding the predetermined threshold should persist beyond this interval of time, add/delete controller 104 applies an appropriate correction signal to either its ADD output or its DEL output. This correction signal persists until the phase comparator 103 voltage output is discontinued.

In the event that the timing wave lags the phase of the incoming data transitions and the positive output of phase comparator 103 exceeds the threshold for a sufficient interval of time, add/delete controller 104 provides a correction signal to its ADD output lead. This correction signal is applied to count-down circuit 102 and, as well known in the art, the application of the correction signal enhances the weight of each input clock pulse and thus enhances the advance or count of count-down circuit 102. The phase of the timing wave output is thus repeatedly advanced with respect to the phase of the incoming signals so long as the correction signal is applied. This tends to shift the phase of the loop in the direction that reduces the difference in phase with the input signals.

Conversely, in the event that a prolonged negative voltage is applied to add/delete controller 104, the controller passes a correction signal via output lead DEL to count-down circuit 102. The weight of each clock pulse applied to count-down circuit 102 is reduced. This repeatedly retards the phase of its output timing wave with respect to the phase of the incoming signals, tending to shift the phase of the loop to reduce the difference with the phase of the input signals.

In accordance with a further feature of add/delete controller 104 as described hereinafter, when phase comparator 103 finds the timing signals to be again substantially in phase with the input signals and drops its output voltage below the above-described threshold, add/delete controller 104 removes the correction signal output without delay. The acquisition time of the controller to turn off the corrections is therefore very short whereas the noise reaction is comparatively long. This removal of the correction signal restores the appropriate initial weight to each clock pulse, terminating phase shifting of the timing wave signal with respect to the input signals.

Figure 2:
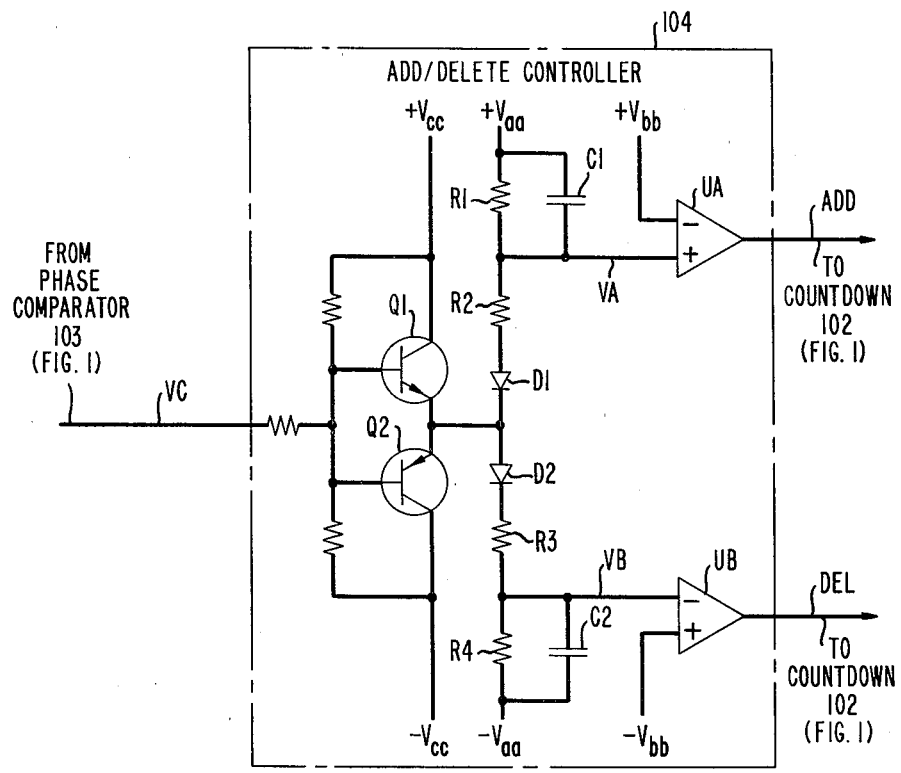
FIG. 2 discloses, in schematic form, certain circuitry suitable for use in the phase locked loop for controlling modifications of the relative phase of the timing wave signals.

The output voltage signal from phase comparator 103 is passed via lead VC to the bases of transistors Q1 and Q2 (FIG. 2) of add/delete controller 104. Assuming that the phase lock loop is substantially in the lock condition, the output of phase comparator 103 is substantially at ground. The application of this ground to the bases of transistors Q1 and Q2 tend to turn the transistors off. With the transistors turned off, their emitters preclude the application of any voltage to the junctions of diodes D1 and D2.

With transistors Q1 and Q2 turned off, the sole current through diodes D1 and D2 is provided from positive battery through resistor R1 (having a relatively high resistance) and resistor R2 (having a relatively low resistance) and then through diodes D1 and D2 and then through resistors R3 and R4 (having resistances equal to resistors R2 and R1, respectively) to battery. The junction of resistors R1 and R2 is therefore close to a null voltage or substantially at ground and correspondingly the junction resistors R3 and R4 are correspondingly substantially at ground. These voltages are then applied via leads VA and VB to differential amplifiers UA and UB. The other input to differential amplifier UA is connected to a positive potential, which potential is less positive than positive battery connected to resistor R1. This positive potential connected to the other input of amplifier UA tends to maintain the amplifier off at this time since the VA potential is substantially at ground. The other input to the UB amplifier comprises a negative potential (less negative than the battery connected to resistor R4) which tends to maintain this amplifier off so long as the VB potential is substantially at ground. Accordingly, in the lock condition of this phase lock loop, amplifiers UA and UB are turned off and the outputs thereof which extend to the ADD and DEL output leads have no correction signals applied thereto.

Assume now that the transitions of the timing wave signals begin to lag the incoming signals and the voltage output of phase comparator 103 tends to become positive. This positive potential is applied to the base of transistor Q1 and tends to bias the transistor on. When transistor Q1 turns on, the emitter voltage of the transistor follows this potential being applied to the base, which emitter voltage potential is passed to the junction of diodes D1 and D2. So long, however, as the emitter voltage potential is maintained below a predetermined threshold, diode D1 continues to draw current therethrough and amplifier VA is maintained biased off.

Assume now that the phase error of the loop continues to rise. The output potential of phase comparator 103 correspondingly rises and this increased positive potential is applied to the base of transistor Q1. The emitter of transistor Q1, following this increased potential, passes a rising voltage potential to the junction of diodes D1 and D2 until the potential drop across diode D1 is insufficient to maintain its conduction. At the point that diode D1 turns off, capacitor C1 starts to discharge through resistor R1, which discharge time is controlled by the capacitance of capacitor C1 and the resistance of resistor R1. After an appropriate time lapse, capacitor C1 discharges sufficiently to raise the potential on lead VA to exceed the potential on the other input of amplifier UA. Accordingly, after this time lapse, amplifier UA turns on and begins to apply correction signals to output lead ADD and thus, in turn, to count-down circuit 102 whereupon the count-down circuit count is advanced as previously noted. At the same time, the raised potential on lead VA is passed through diode D1 to the emitters of transistors Q1 and Q2.

Assume now that the phase error is being corrected and the output potential of phase comparator 103 begins to drop back towards ground. This output voltage of phase comparator 103 is passed to the base of transistor Q2. The emitter of transistor Q2 presently has applied thereto the raised potential on lead VA that is being passed via diode D1 to the junction of diodes D1 and D2. When the voltage on the base of transistor Q2 drops sufficiently below the potential on the emitter, the transistor turns on and capacitor C1 quickly charges through diode D1 and transistor Q2. The voltage at the junction of resistors R1 and R2 is immediately restored to approximately ground and amplifier UA is turned off without delay. At the same time, the previously described current path through diodes D1 and D2 is re-established and transistors Q1 and Q2 turn off. Accordingly, the ADD corrections are quickly removed and the circuit restored upon the correction of the phase of the loop.

Alternatively, if the timing wave signals begin to lead the incoming data transitions, the output voltage of phase comparator 103 goes negative. This negative potential is passed to the base of transistor Q2 and its emitter following this potential passes it to the junction of diodes D1 and D2. When the potential drops sufficiently to remove the necessary bias for the current conduction of diode D2, the diode turns off and capacitor C2 begins to discharge through resistor R4. If this situation persists for an appropriate interval of time, capacitor C2 discharges sufficiently to render the potential at the junction of resistor R3 and resistor R4 sufficiently negative with respect to the negative potential applied to the other input of amplifier UB to turn the amplifier on. This results in the application of a correction signal to output lead DEL. This correction signal inhibits the normal advance of the count down to thereby retard the phase of count-down circuit 102.

When the phase of the loop timing wave is substantially restored to correspond to the phase of the input data signals, the output potential of phase comparator 103 returns to "0", which "0" potential is passed to the base of transistor Q1 and the transistor turns on. Capacitor C2 quickly charges through diode D2 and transistor Q1 and the potential at the junction of resistors R3 and R4 is rapidly raised toward "0" to turn differential amplifier UB off. This removes the correction signal on lead DEL being passed to count-down circuit 102 to restore the phase lock loop to the lock condition.

Although a specific embodiment of this invention has been shown and described, it will be understood that various modifications may be made without departing from the spirit of this invention.

What is claimed is:

1. A timing wave recovery circuit comprising:
   means for generating phase shiftable timing wave signals,
   means for developing analog phase error signals whose amplitudes define magnitudes of phase differences between the timing wave signals and input signals,
   timing means arranged to pass from an initial condition to an operated condition after an interval of time in response to a persistance of the phase error signals,
   means responsive to the operated condition of the timing means for repeatedly shifting the phase of the timing wave signals, and
   means responsive to discontinuance of the phase error signals for resetting the timing means without delay to the initial condition.

2. A timing wave recovery circuit in accordance with claim 1 wherein the timing means is arranged to pass to the operated condition in response to phase error signals exceeding a predetermined threshold magnitude.

3. A timing wave recovery circuit in accordance with claim 2 wherein:
   the developing means includes means for developing phase error signals defining a lag error condition when the phase of the timing wave signals lags the phase of the input signals,
   the timing means includes a lag timing circuit arranged to pass to the operated condition in response to phase error signals defining the lag error condition, and
   the shifting means further includes means responsive to the operated condition of the lag timing circuit for repeatedly advancing the phase of the timing wave signals.

4. A timing wave recovery circuit in accordance with claims 1 or 3 wherein:
   the developing means includes further means for developing phase error signals defining a lead error condition when the phase of the timing wave signals leads the phase of the input signals,
   the timing means includes a lead timing circuit arranged to pass to the operated condition in response to phase error signals defining the lead error condition, and
   the shifting means includes additional means responsive to the operated condition of the lead timing circuit for repeatedly retarding the phase of the timing wave signals.

* * * * *